United States Patent [19]
Ogasawara et al.

[11] Patent Number: 5,718,303
[45] Date of Patent: Feb. 17, 1998

[54] ENGINE HOOD CONSTRUCTION OF WORK VEHICLE

[75] Inventors: Hiroyuki Ogasawara; Mikio Yuki, both of Sakai, Japan; Akira Minoura, Gainesville, Ga.; Kazuaki Kurohara, Sakai, Japan; Masaki Hayashi, Sakai, Japan; Katsuhiko Uemura, Sakai, Japan; Eriya Harada, Sakai, Japan

[73] Assignee: Kubota Corporation, Japan

[21] Appl. No.: 557,944

[22] Filed: Nov. 14, 1995

[30] Foreign Application Priority Data

Nov. 16, 1994 [JP] Japan .................. 6-281600

[51] Int. Cl.⁶ .................................. B62D 25/10
[52] U.S. Cl. .................................. 180/69.21
[58] Field of Search .................. 180/69.2, 69.21, 180/69.24; 49/463, 464, 415

[56] References Cited

FOREIGN PATENT DOCUMENTS

| | | |
|---|---|---|
| 57-25075 | 6/1982 | Japan . |
| 60-174677 | 5/1985 | Japan . |
| 63-69082 | 7/1988 | Japan . |

*Primary Examiner*—Richard M. Camby
*Attorney, Agent, or Firm*—Webb Ziesenheim Bruening Logsdon Orkin & Hanson, P.C.

[57] ABSTRACT

An engine hood construction for a work vehicle is disclosed. The engine hood is vertically separatable into a lower hood section and an upper hood section. The lower hood section is fixedly attachable to and detachable from a vehicle frame, and the upper hood section is attached to the vehicle frame to be pivotably and vertically opened and closed relative to the frame. A control panel is provided at a rear portion of the engine hood and forming a rear wall of an engine room. The control panel has a forwardly opened hook shape in a plan view. The construction further includes a connecting arrangement for fixedly connecting the lower hood section to the vehicle frame and engaging members for enabling the lower hood section to be engaged with the control panel along a fore-and-aft direction of the vehicle when the connecting arrangement is not connected.

14 Claims, 8 Drawing Sheets

ENGINE HOOD CONSTRUCTION OF WORK VEHICLE

BACKGROUND OF THE INVENTION

1. Field of the Invention

The present invention relates to a work vehicle such as a passenger-driven lawn mower vehicle and a tractor. The invention more particularly relates to an attachment/detachment construction of an engine hood of the work vehicle, the engine hood including two upper and lower sections separatable from each other, the lower section being fixedly connected to a vehicle frame, the upper section being pivotably opened and closed relative to the frame, the vehicle further including a control panel provided at a rear portion of the engine hood and forming a rear wall of an engine room.

2. Description of the Related Art

Conventionally, for fixedly connecting the lower hood section to the vehicle frame, the lower section is fixed here by inserting a bolt through a bolt hole defined at a lower end of the lower hood section and a corresponding bolt hole defined in the vehicle frame. This two-section hood construction having two vertically separatable sections has the advantage of allowing a lighter opening/closing pivotal operation of the engine hood, in comparison with the one integral hood construction.

However, in order to detach the lower hood section for the purpose of maintenance, this operation requires the use of such a tool as a spanner or monkey wrench. Moreover, in order to fixedly attach the lower hood section to the vehicle frame, the attachment must be done in such a manner that the rear end of the lower hood section and the front end of the control panel are aligned with no gaps therebetween in the forward/rearward direction as well as in the right/left direction. Accordingly, the attachment and detachment operations of the lower hood section cannot be done speedily or easily.

Moreover, if the connected condition between the rear end of the lower hood section and the forward end of the control panel is incomplete, dust may enter through any gaps formed at such incompletely connected areas. Therefore, there remains room for improvement for providing a construction which minimizes the gaps between the connected portions and which may allow a reliable connection to be made easily and speedily.

A primary object of the present invention is to allow a speedy and easier attachment and detachment of the lower hood section through improvement of the fixing construction of the lower hood section.

SUMMARY OF THE INVENTION

For accomplishing the above-noted object, an engine hood construction for a work vehicle, according to the present invention, comprises:

an engine hood which is vertically separatable into a lower hood section and an upper hood section, the lower hood section being fixedly attachable to and detachable from a vehicle frame, the upper hood section being attached to the vehicle frame to be pivotably and vertically opened and closed relative to the frame;

a control panel provided at a rear portion of the engine hood and forming a rear wall of an engine room, the control panel having a forwardly opened hook shape in a plan view;

connecting means for fixedly connecting the lower hood section to the vehicle frame; and engaging means for enabling the lower hood section to be engaged with the control panel along a fore-and-aft direction of the vehicle when the connecting means is not connected.

With the above-described construction, the lower hood section and the control panel may be assembled together by moving the lower hood section along the fore-and-aft direction of the vehicle while maintaining the connecting means under the unconnected condition. Accordingly, the lower hood section may be attached to the vehicle frame easily.

Further, the engaging means can comprise a pair of slits defined in right and left side faces of the lower hood section and a pair of matching projections engageable with the slits and provided at corresponding portions of the control panel. With this construction, for attaching the lower hood section to the vehicle frame, the lower hood section is moved along the fore-and-aft direction of the vehicle body until the slits thereof come into engagement with the projections. Thus, the attaching operation of the lower hood section may be effected more easily.

Also, as the engagement between the slits and the projections restricts the right-left movement of the lower hood section relative to the vehicle frame, the positioning operation of the lower hood section relative to the vehicle frame may be done easily as well.

Further, the connecting means may comprise a knob bolt, i.e. a bolt having a knob. Then, the attachment and detachment of the lower hood section to and from the vehicle frame may be effected without using such a tool as a spanner.

In addition to the facilitation of the attachment and detachment of the lower hood section, a further object of the present invention is to provide a connection construction which minimizes intrusion of dust.

For accomplishing this further object, in addition to the above features, the lower hood section includes, at rear lateral ends thereof, first bulging portions extending laterally and outwardly; and the control panel includes, at forward lateral ends thereof, second bulging portions connectable with the first bulging portions in a co-extensive manner. With this construction, it is possible to prevent gaps from being formed between the connected portions of the lower hood section and the control panel, thereby to minimize intrusion of dust due to presence of such gaps.

Preferably, each laterally and outwardly extending first bulging portion is formed so as to extend with an inclination relative to a longitudinal axis of the vehicle frame, and the corresponding second bulging portion is formed so as to be co-extensive with this first bulging portion. With this construction, it becomes possible to increase the area of the coextensive or gapless connection between the lower hood section and the vehicle frame. As a result, this construction may prevent intrusion of dust even more effectively.

As described above, according to the features of the present invention, the attachment and detachment of the lower hood section relative to the vehicle frame may be effected speedily and easily. In addition, the connected condition realized by this attachment provides a superior sealing effect against dust intrusion.

Further and other objects, features and effects of the invention will become more apparent from the following more detailed description of the embodiments of the invention with reference to the accompanying drawings.

DETAILED DESCRIPTION OF THE PREFERRED EMBODIMENTS

Preferred embodiments of the invention concerning a mid-mount passenger-driven type lawn mower vehicle as one example of a work vehicle relating to this invention will be described next with reference to the accompanying drawings.

Figure 1:
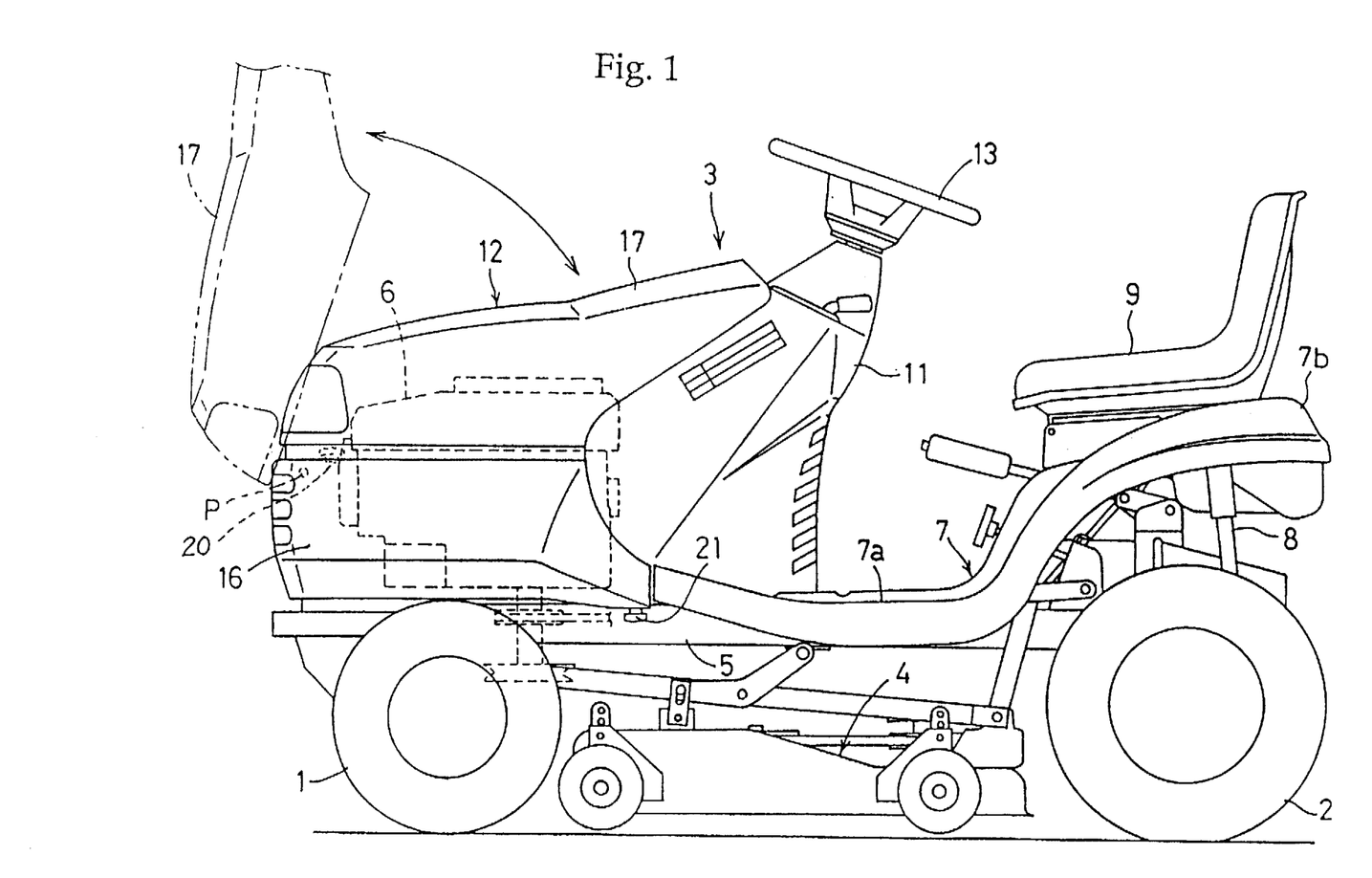
FIG. 1 is a side view showing an entire passenger-driven lawn mower vehicle.
Figure 2:
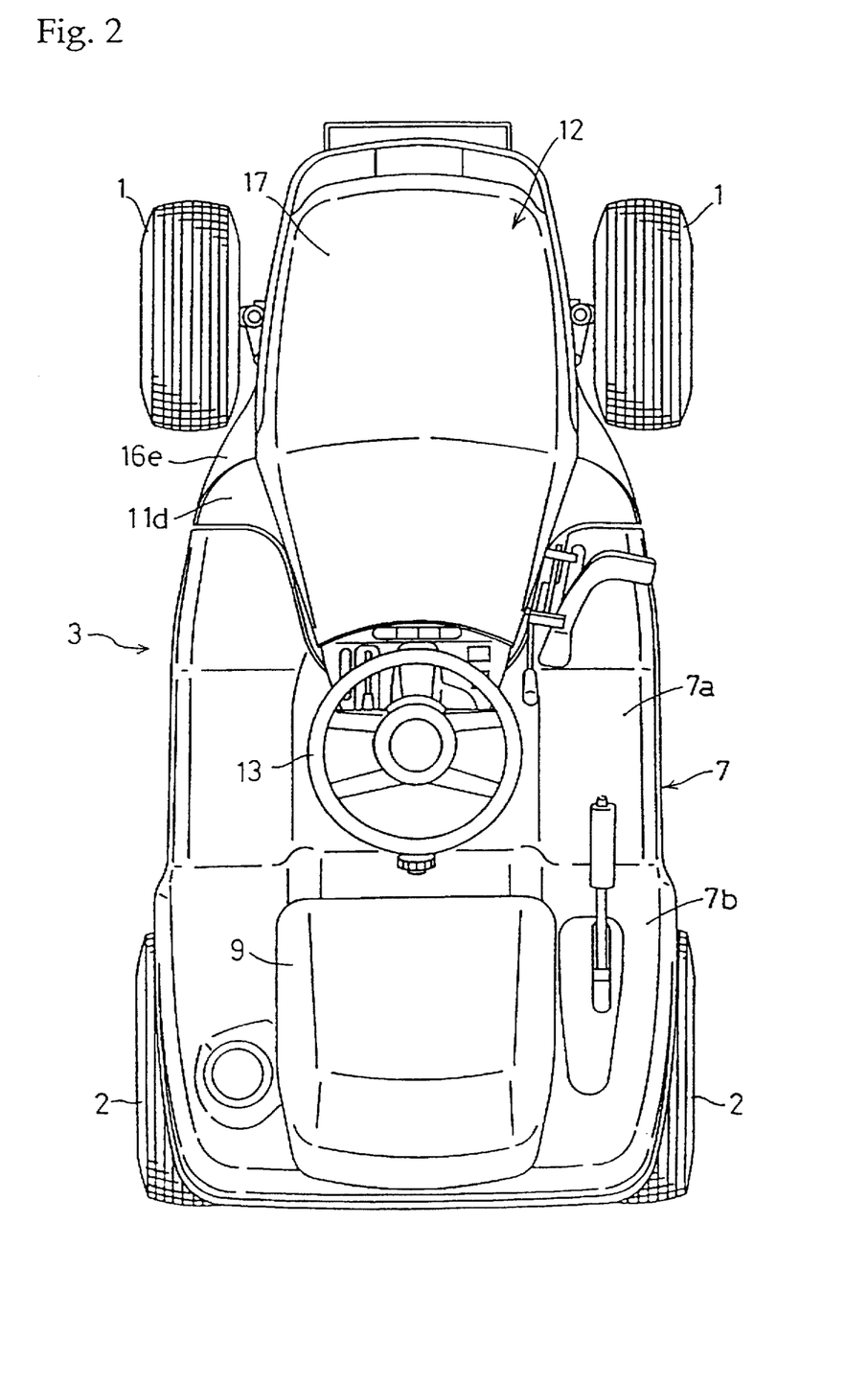
FIG. 2 is a plan view showing the entire passenger-driven lawn mower vehicle.

As shown in FIG. 1, this mid-mount passenger-driven lawn mower vehicle includes a vehicle body 3 having front and rear wheels 1, 2, and a mower 4 liftably suspended from the body 3 between the front and rear wheels 1, 2. An engine 6 is mounted at a forward area of a pair of right and left vehicle frames 5 of the body 3. A fender 7 extending from a middle position relative to the fore-and-aft direction of the vehicle to a rear position is attached to the vehicle frames 5 via suspension mechanisms 8. This fender 7 integrally includes footstep portions 7a and a rear-wheel fender portion 7b; and a driver's seat 9 is mounted at a right-to-left center on the upper face of the rear-wheel fender portion 7b.

An engine room housing the engine 6 is formed by a control panel 11 vertically disposed on the vehicle frames 5 forwardly of the driver's seat and a hood 12 provided forwardly of the control panel 11.

Figure 4:
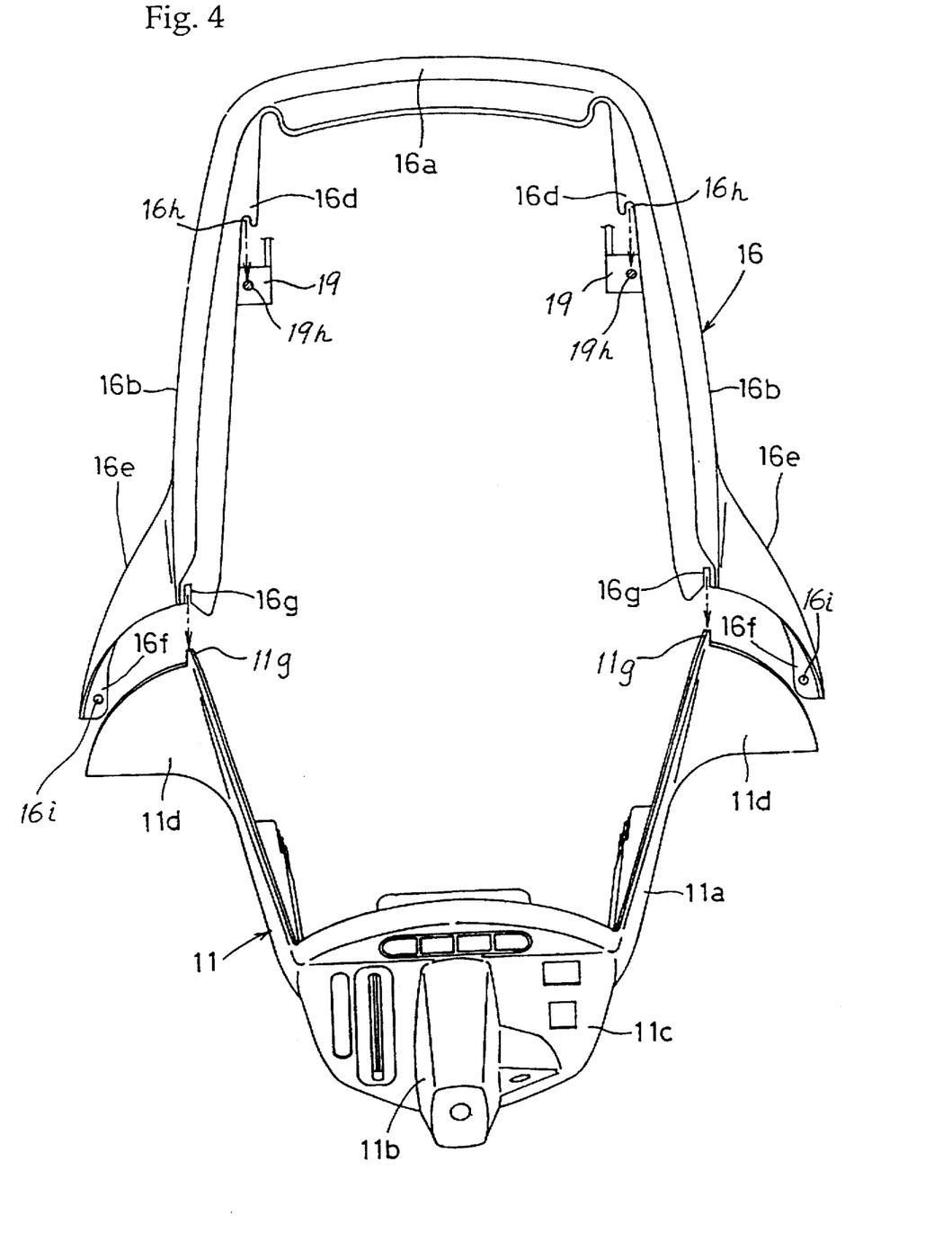
FIG. 4 is a plan view showing the lower hood section and a control panel.
Figure 6:
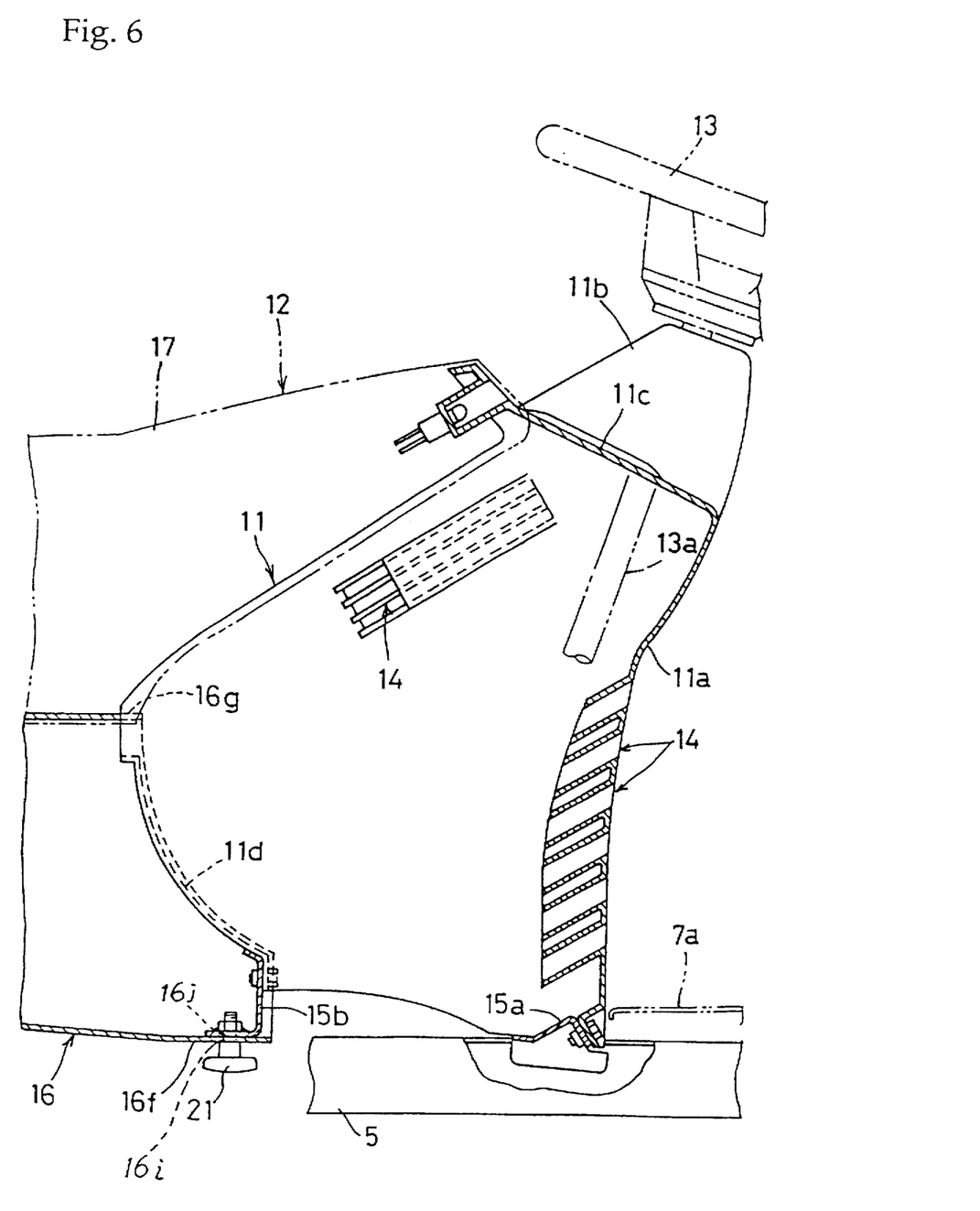
FIG. 6 is a side view in a vertical section showing the rear area of the engine room.

As shown in FIG. 4 or 6, the control panel 11 comprises a panel body 11a, a convex portion 11b through which a handle post 13a of a steering wheel 13 extends, and an instrument panel 11c integrally formed together by molding of resin. The panel body 11a defines, at a front face and right and left side faces thereof, slits 14 for introducing cooling air.

Further, right and left bottom portions of the panel body 11c are formed outwardly convex to the right and left respectively. A bottom end of this panel body 11c is bolt-connected with a stay attached to and between the frames 5. The bulging portions 11d formed at the right and left bottom ends of the panel body 11a as described above, provide footrests inclined upwards toward the forward direction to extend continuously with the right and left front ends of the respective footstep portions 7a of the fender 7. And, these right and left bulging portions 11d are bolt-connected with right and left extension portions of a further stay 15b attached to the vehicle frames 5.

Figure 7:
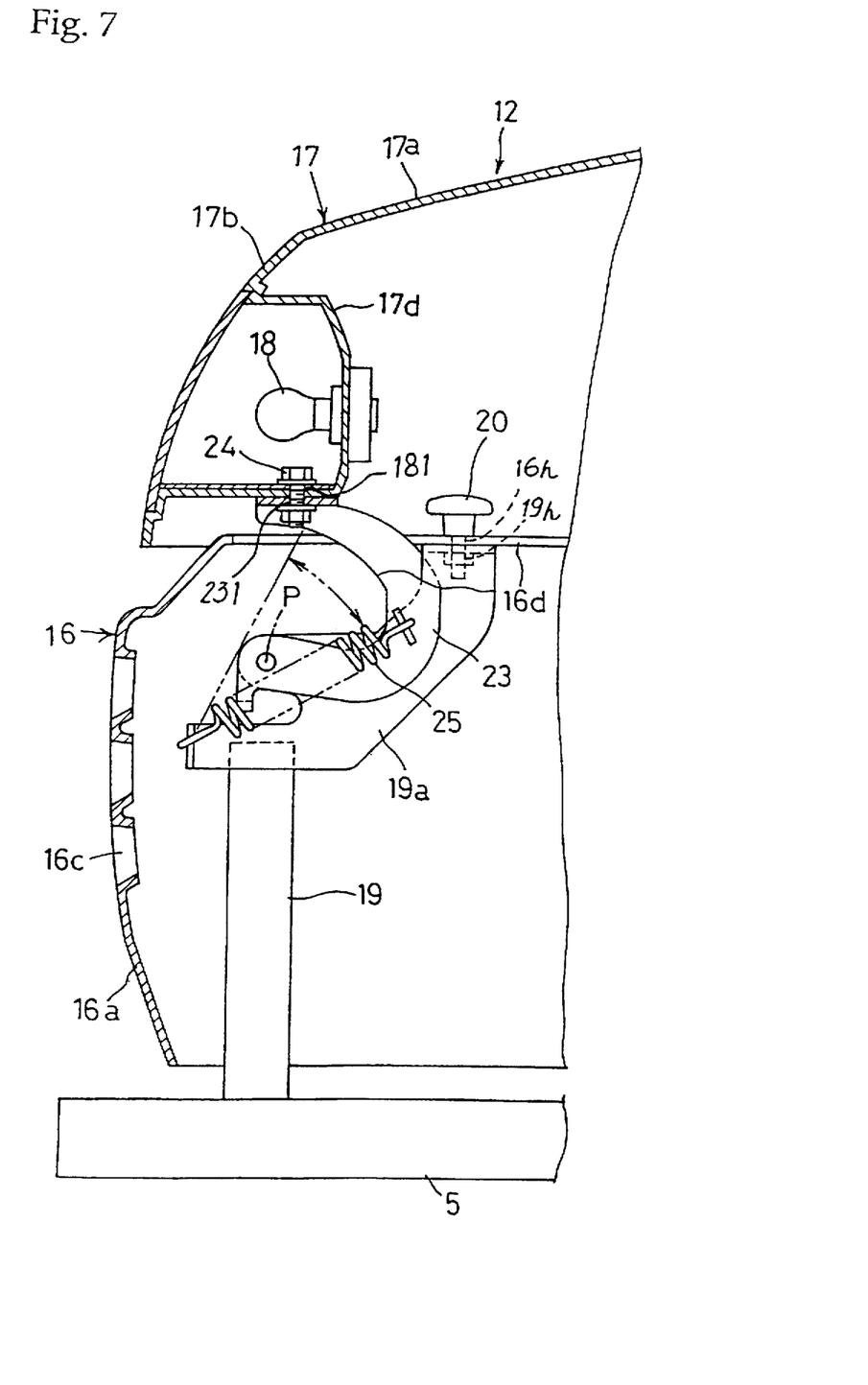
FIG. 7 is a side view in a vertical section showing a front portion of the engine hood.
Figure 8:
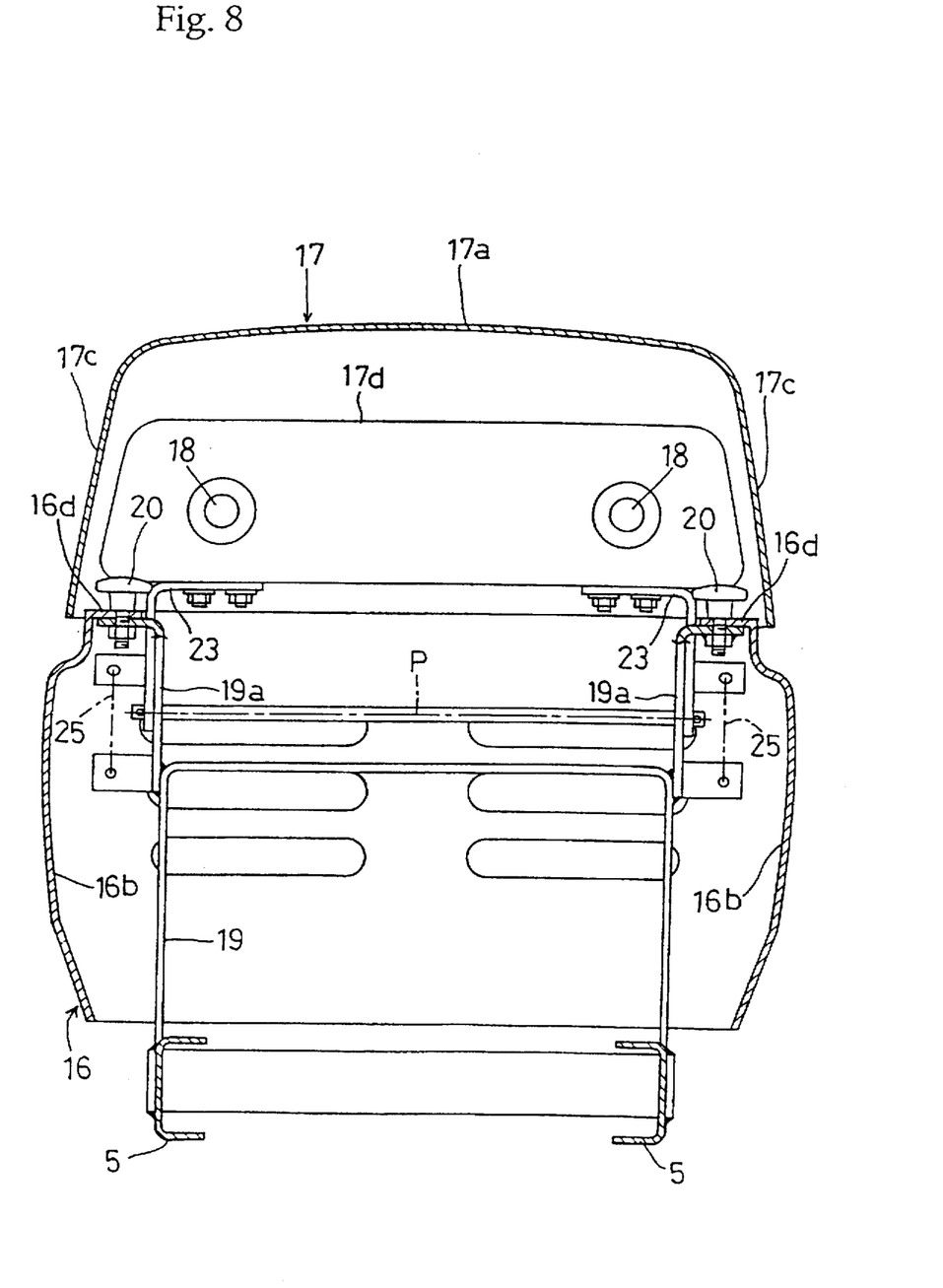
FIG. 8 is a rear view in a vertical section showing the front portion of the engine hood.

As shown in FIGS. 1, 7 and 8, the hood 12 consists of a lower hood section 16 and an upper hood section 17 both formed by molding of resin. The lower hood section 16 includes a front wall portion 16a and a pair of right and left side wall portions extending in opposition to each other with a downwardly decreasing distance therebetween. The front wall portion 16c forms an air ventilation grill 16c. Whereas, the upper hood section 17 includes an upper wall portion 17a, a front wall portion 17b and a pair of right and left side wall portions extending in opposition to each other with an upwardly decreasing distance therebetween. The front wall portion 17b includes a headlight box 17d for accommodating headlights 18 therein.

Then, bolt holes 19h (corresponding to first connecting members) defined in an upper side of a arch-shaped support 19 vertically mounted at a front portion of the vehicle frames 5, and U-shaped recesses 16h (see FIGS. 3 and 4, corresponding to first connected members) defined at upper bent portions of the lower hood section 16 are connected with each other by means of knob bolts 20 (corresponding to a first fixing members). Here, these bolt holes 19h, the recesses 16h and the knob bolts 20 together constitute a first connecting means.

Figure 5:
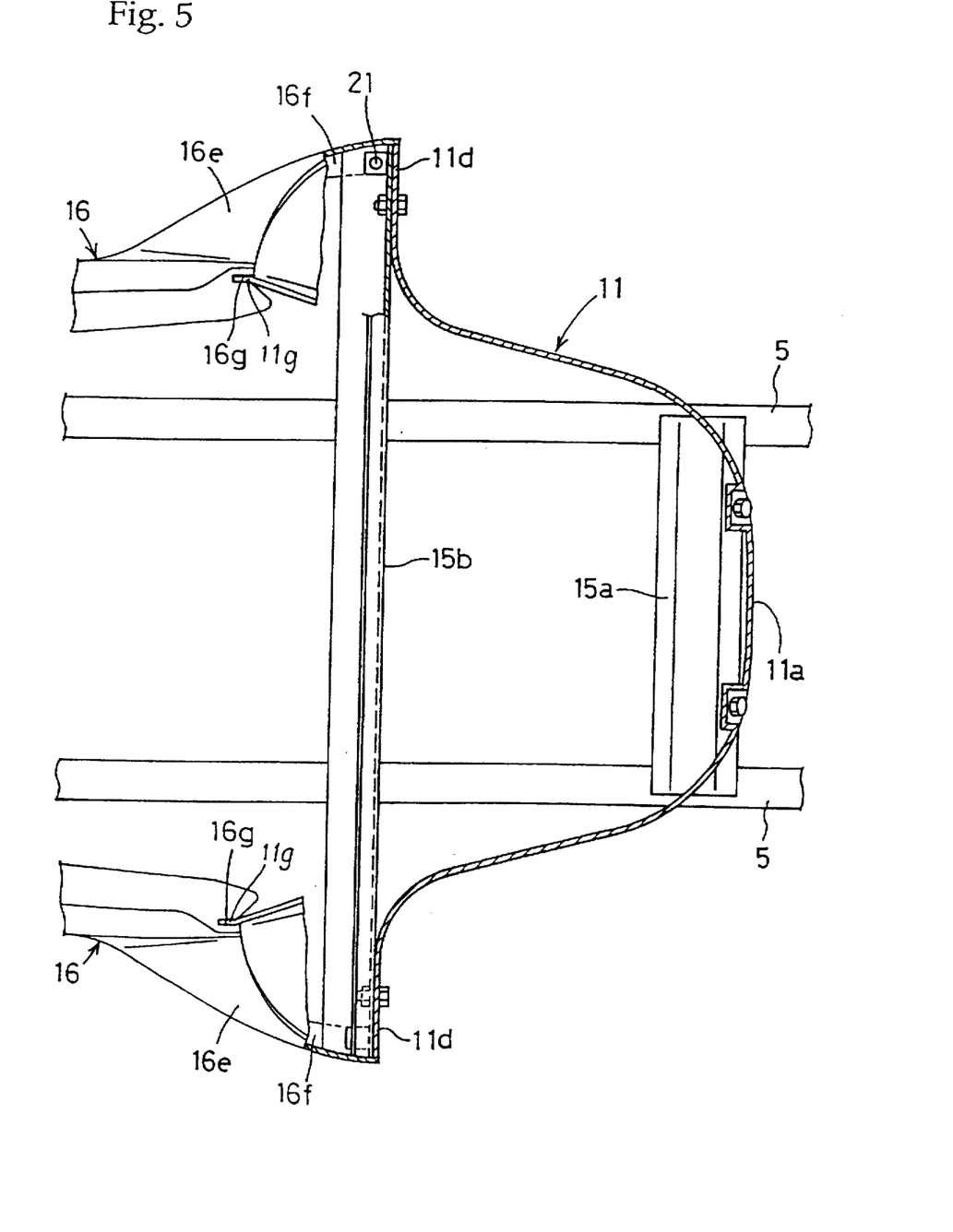
FIG. 5 is a plan view in a horizontal section showing a rear area of an engine room.

As shown in FIGS. 5 and 6, rear side bottom portions of the lower hood section 16 are formed outwardly convex to provide bulging portions (corresponding to first bulging portions) which are formed so as to be gaplessly and co-extensively connectable with the afore-mentioned corresponding bulging portions 11d (corresponding to second bulging portions) formed at the right and left bottom side portions of the control panel 11. Further, each bulging portion 16e extends, in addition to the lateral outward direction, with an inclination relative to the longitudinal axis of the vehicle body. This inclination arrangement serves to increase the area of the co-extensively connected portions between the lower hood section 16 and the control panel, so as to prevent intrusion of dust more effectively. Preferably, these first and second bulging portions 16e, 11d extend along the entire height of the lower hood section 16.

As shown in FIGS. 4 and 6, the right and left bulging portions 16e include lower bent portions 16f which define bolt holes 16i (corresponding to second connected members). Then, by means of knob bolts 21 (see FIG. 6, corresponding to second fixing members) engaged into these holes 16i and also engaging holes 16j defined at right and left extension portions of the stay 15b attached to the vehicle frames, the lower hood section 16 is detachably attached to the vehicle body.

Here, the engaging holes 16j, the bolt holes 16i, and the knob bolts 21 together constitute a second connecting means. Incidentally, the engaging holes 16j may comprise simple through holes.

Further, the first connecting means the second connecting means will be generically referred to as 'connecting means.'

Figure 3:
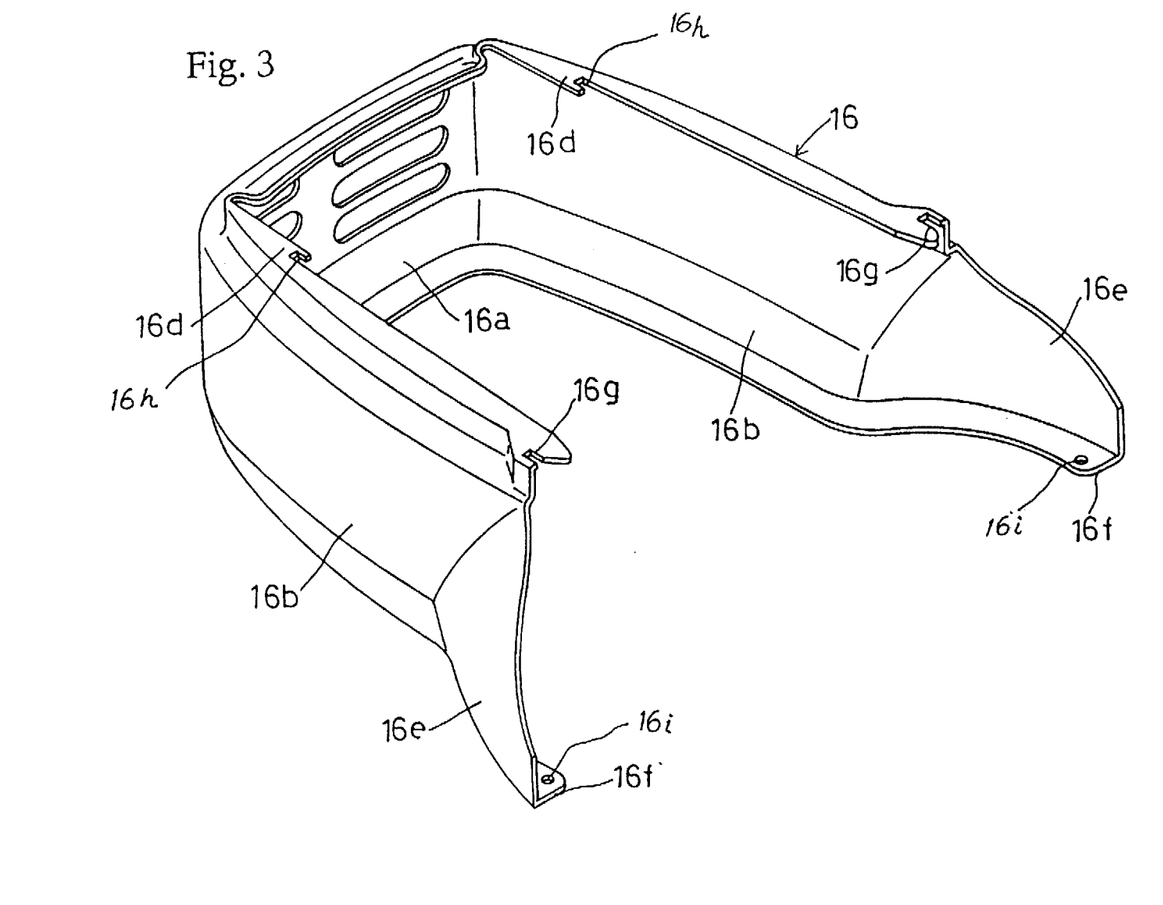
FIG. 3 is a perspective view of a lower hood section.

As shown in FIGS. 3 and 4 in particular, at rear ends of upper bent portions 16d of the lower hood section 16, there are defined slits 16g extending along the fore-and-aft direction of the vehicle. On the other hand, front ends of the control panel 11 include, at positions thereof corresponding to the slits 16g, a pair of engaging projections 11g engageable with the slits 16g. And, these slits and the engaging projections 11g together constitute engaging means. Then, through this engaging means, the lower hood section 16 is rendered engageable and disengageable to and from the vehicle body along the fore-and-aft direction of the same.

As shown in FIG. 7, the upper hood section 17 includes, at the front side thereof, the headlight box 17d. This headlight box 17d defines, in a bottom face thereof, bolt holes 18l. On the other hand, a pair of right and left hinge members 23 (corresponding to pivot means) define, at upper ends thereof, bolt holes 23l. Then, these hinge members 23 and the upper hood section 12 are connected with each other by means of bolts 24 engaging with both of the bolt holes 18l, 23l. The lower ends of the hinge members 23 are pivoted to attachment elements 19a attached respectively to the upper right and left ends of the arch-shaped support 19 so as to be pivotable about an axis P. With this construction, relatively simple maintenance operations such as replenishment of engine oil, replacement of spark plugs, or the like may be done by pivotably opening the upper hood section 17 about the pivot axis P.

Further, by withdrawing the knob bolts 20, 21 as the connecting means and then forwardly withdrawing and dismounting the lower hood section 16 entirely, the engine room may be widely exposed so as to allow more complicated maintenance operations such as checking of the lower portion of the engine or dismounting of the entire engine.

The fixing portions between the hinge members 23 as the pivot means and the upper hood section 12 are provided at such positions not to interfere with the first connecting means, i.e. laterally inwardly of the vehicle body. Accordingly, the opening/closing operation of the upper hood section 17 and the dismounting operation of the lower hood section 16 may be effected independently of each other.

Further, in order to prevent the upper hood section 17 from being inadvertently closed by an effect of e.g. a strong wind, springs 25 are loaded and interposed between the support 19 and the respective hinge members 23.

[other embodiments]

The work vehicle may comprise a tractor.

The engaging holes 16i formed at the lower bent portions 16f of the right and left bulging portions 16e as the second connected member may be substituted for by slits extending in the fore-and-aft direction of the vehicle body.

The engaging means may be substituted for by protruding members formed on the lower hood section 16 and engaging recesses engageable with the protruding members formed on the control panel.

The bolts holes or engaging holes as the first and second connecting means need not be threaded holes engageable with the bolts. Instead, these holes may be simple threadless through holes, so that the fixing connection may be effected by using the bolts and units in combination.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. An engine hood construction for a work vehicle, comprising:

an engine hood which is vertically separatable into a lower hood section and an upper hood section, the lower hood section being fixedly attachable to and detachable from a vehicle frame, the upper hood section being attached to the vehicle frame to be pivotably and vertically opened and closed relative to the frame, wherein the lower hood section comprises an integral unit having a right sidewall portion, a left sidewall portion and a front wall portion;

a control panel provided at a rear portion of the engine hood and forming a rear wall of an engine room;

connecting means for fixedly connecting the lower hood section to the vehicle frame; and engaging means for enabling the lower hood section to be engaged with the control panel along a fore-and-aft direction of the vehicle when the connecting means is not connected.

2. An engine hood construction for a work vehicle, comprising:

an engine hood which is vertically separatable into a lower hood section and an upper hood section, the lower hood section being fixedly attachable to and detachable from a vehicle frame, the upper hood section being attached to the vehicle frame to be pivotably and vertically opened and closed relative to the frame;

a control panel provided at a rear portion of the engine hood and forming a rear wall of an engine room;

connecting means for fixedly connecting the lower hood section to the vehicle frame; and engaging means for enabling the lower hood section to be engaged with the control panel along a fore-and-aft direction of the vehicle when the connecting means is not connected, wherein said engaging means comprises a pair of slits defined in right and left side faces of the lower hood section and a pair of matching projections engageable with the slits and provided at corresponding portions of the control panel.

3. An engine hood construction for a work vehicle, comprising:

an engine hood which is vertically separatable into a lower hood section and an upper hood section, the lower hood section being fixedly attachable to and detachable from a vehicle frame, the upper hood section being attached to the vehicle frame to be pivotably and vertically opened and closed relative to the frame;

a control panel provided at a rear portion of the engine hood and forming a rear wall of an engine room;

connecting means for fixedly connecting the lower hood section to the vehicle frame; and engaging means for enabling the lower hood section to be engaged with the control panel along a fore-and-aft direction of the vehicle when the connecting means is not connected, wherein said engaging means comprises a pair of projections formed on right and left faces of the lower hood section and a pair of matching slits engageable with said projections and provided at corresponding portions of the control panel.

4. An engine hood construction according to claim 2, wherein said connecting means includes a first connecting means and a second connecting means;

said first connecting means includes first connected members provided to upper bent portions of said right and left side faces adjacent a front end of said lower hood section, first connecting members provided at corresponding portions of said vehicle frame, and first fixing members capable of fixing said first connected members to said first connecting members; and said second connecting means includes second connected members provided to lower bent portions of said right and left side faces adjacent a rear end of said lower hood section, second connecting members provided at corresponding portions of said vehicle frame and second fixing members capable of fixing said second connected members to said second connecting members.

5. An engine hood construction according to claim 4, wherein said first connecting members comprise engaging holes defined in a support vertically mounted on said vehicle frame; said first connected members comprise slits extending along a longitudinal direction of the vehicle body; and said first fixing members comprise bolts engageable with said engaging holes.

6. An engine hood construction according to claim 4, wherein said second connecting members comprise engaging holes defined in said lower hood section; said second connected members comprise slits extending along a longitudinal direction of the vehicle body; and said second fixing members comprise bolts engageable with said engaging holes.

7. An engine hood construction according to claim 4, wherein said second connecting members comprise engaging holes defined in said vehicle frame; said second connected members comprise holes defined in said bent portions; and said second fixing members comprise bolts engageable with said engaging holes through said holes.

8. An engine hood construction according to claim 1, wherein said upper hood section is vertically pivotable by a pair of pivot means relative to a support vertically mounted on said vehicle frame, and each said pivot means is disposed inwardly of said first connecting means in a lateral direction of the vehicle body.

9. An engine hood construction according to claim 8, wherein each said pivot means includes a hinge member pivotably attached to said support, and a fixing portion to be fixed with said hinge member and provided at a recess for housing a headlight formed in said upper hood section.

10. An engine hood construction for a work vehicle, comprising:

an engine hood which is vertically separatable into a lower hood section and an upper hood section, the lower hood section being fixedly attachable to and detachable from a vehicle frame, the upper hood section being attached to the vehicle frame to be pivotably and vertically opened and closed relative to the frame;

a control panel provided at a rear portion of the engine hood and forming a rear wall of an engine room;

connecting means for fixedly connecting the lower hood section to the vehicle frame; and engaging means for enabling the lower hood section to be engaged with the control panel along a fore-and-aft direction of the vehicle when the connecting means is not connected, wherein said lower hood section includes, at rear lateral ends thereof, a pair of first bulging portions extending laterally and outwardly relative to the vehicle body; and said control panel includes, at forward lateral ends thereof, a pair of second bulging portions connectable with said first bulging portions in a co-extensive manner when said engine hood is assembled with the vehicle body.

11. An engine hood construction according to claim 10, wherein said first and second bulging portions vertically extend along substantially the entire height of said right and left walls.

12. An engine hood construction for a work vehicle comprising:

an engine hood which is vertically separatable into a lower hood section and an upper hood section, the lower hood section being fixedly attachable to and detachable from a vehicle frame, the upper hood section being attached to support vertically mounted on the vehicle frame to be pivotably opened and closed about a horizontal axis, wherein the lower hood section comprises an integral unit having a right sidewall portion, a left sidewall portion and a front wall portion;

a control panel provided at a rear portion of the engine hood and forming a rear wall of an engine room;

connecting means for fixedly connecting the lower hood section to the vehicle frame; and engaging means for enabling the lower hood section to be engaged with the control panel along a fore-and-aft direction of the vehicle when the connecting means is not connected, said engaging means, under the engaged condition thereof, restricting lateral movements of said lower hood section relative to the vehicle frame.

13. An engine hood construction for a work vehicle comprising:

an engine hood which is vertically separatable into a lower hood section being fixedly attachable to and detachable from a vehicle frame, the upper hood section being attached to support vertically mounted on the vehicle frame to be pivotably opened and closed about a horizontal axis;

a control panel provided at a rear portion of the engine hood and forming a rear wall of an engine room;

connecting means for fixedly connecting the lower hood section to the vehicle frame; and engaging means for enabling the lower hood section to be engaged with the control panel along a fore-and-aft direction of the vehicle when the connecting means is not connected, said engaging means, under the engaged condition thereof, restricting lateral movements of said lower hood section relative to the vehicle frame, wherein said engaging means comprises a pair of slits defined in right and left side faces of the lower hood section and a pair of matching projections engageable with the slits and provided at corresponding portions of the control panel.

14. An engine hood construction according to claim 13, wherein said connecting means includes knob bolts capable of fixing said lower hood section to said vehicle frame.

* * * * *